P. D. COSGROVE.
SUSPENSION OF VEHICLES.
APPLICATION FILED OCT. 16, 1918.

1,313,167. Patented Aug. 12, 1919.

Inventor
P. D. Cosgrove
by his Atty

UNITED STATES PATENT OFFICE.

PATRICK D. COSGROVE, OF COBRAM, VICTORIA, AUSTRALIA.

SUSPENSION OF VEHICLES.

1,313,167.  Specification of Letters Patent.  Patented Aug. 12, 1919.

Application filed October 16, 1918. Serial No. 258,380.

*To all whom it may concern:*

Be it known that I, PATRICK DOMINICK COSGROVE, a subject of the King of Great Britain and Ireland, and a resident of the post-town of Cobram, in the county of Moira, State of Victoria, Commonwealth of Australia, (whose post-office address is in the said post-town of Cobram,) have invented certain new and useful Improvements in the Suspension of Vehicles, of which the following is a specification.

This invention relates to the suspension of vehicles and more particularly to motor vehicles used for the transportation of passengers or goods upon roadways.

Many and various devices have been hitherto employed to absorb road shocks without transmitting them to the body of the vehicle, but the present invention is mainly concerned in the provision of means whereby the body or chassis of the vehicle may be so mounted in relation to the wheels that the body will always remain in a position laterally parallel to the road surface irrespective of the relative positions of the wheels and axles which naturally assume various different attitudes due to inequalities in the road surface. The invention also provides an improved resilient suspension which will effectively eliminate road shocks or jars or reduce same to a minimum before reaching the body of the vehicle.

The various parts or elements of the invention are simple and readily accessible for inspection, repair or replacement and may be easily adapted for use on existing or new machines.

Referring to the drawings which form part of this specification:—

Figure 1:
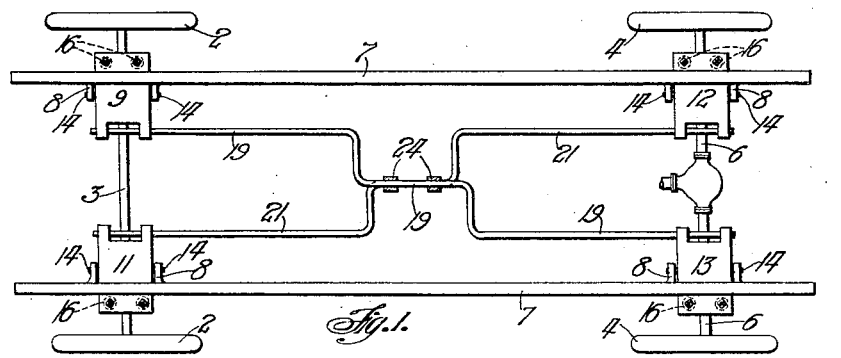
Figure 1 is a diagrammatic plan showing one form of the invention applied to the chassis of a motor vehicle.
Figure 2:
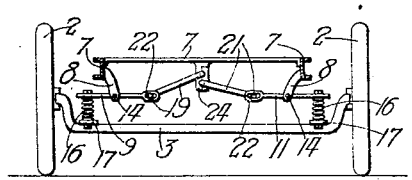
Fig. 2 is an end view of Fig. 1.

The invention is applied to a vehicle having the usual front wheels 2 mounted on a front axle 3 and rear wheels 4 mounted on a rear axle 6. Above the axles is the chassis 7.

Pivoted to the chassis or to extensions 8 therefrom are two front rocking elements 9 and 11 and two rear rocking elements 12 and 13. Each of these rocking elements is pivoted upon a longitudinal axis provided by pivot pins 14 and is preferably in the form of a frame as seen in Figs. 1 to 5 of the drawings. These rocking frames may be of any suitable construction and of suitable length and width, preferably of sufficient width to provide a considerable distance between the two pivot pins 14 so that the frames are evenly and securely mounted against diagonal thrust.

Interposed between each axle and the outer ends of the adjacent rocking elements or frames are lower or outer springs 16. These springs may be of helical, elliptical or other construction and are attached by suitable means to the axles and the rocking elements. In the constructions illustrated in the drawings buffer plates 17 are provided to support the lower ends of said springs, two of which are shown beneath each of the rocking elements.

Figure 3:
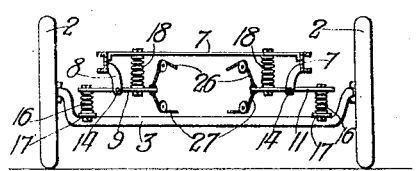
Fig. 3 is an end view of a modification in which both upper and lower springs are employed and compensating cables take the place of the compensating cranks shown in Figs. 1 and 2. Parts are broken away for convenience of illustration.
Figure 4:
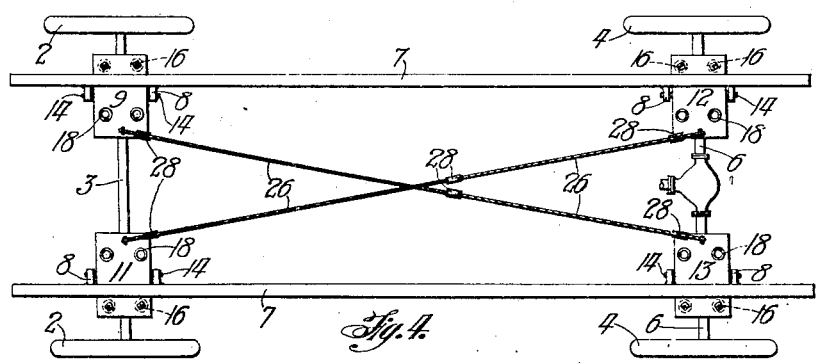
Fig. 4 is a diagrammatic plan of the modification seen in Fig. 3.
Figure 5:
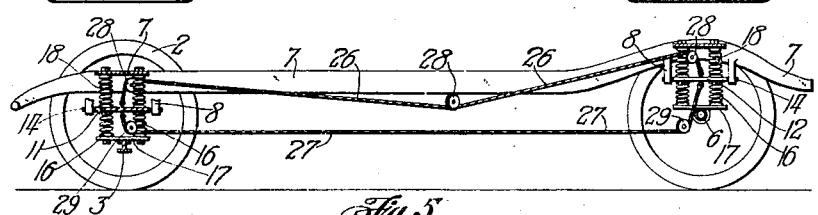
Fig. 5 is a diagrammatic side view of Fig. 4, illustrating the compensating connections between two diagonally opposite road wheels.

Between the inner ends of each of the rocking elements and the chassis or body of the vehicle and upon the other side of the longitudinal pivots 14 may be upper or inner springs 18 (Figs. 3 to 5). These springs are preferably of helical form and if employed, may be arranged singly or in series as shown.

Extending between the two diagonally opposite rocking elements (that is between the front rocking element on one side of the vehicle and the rear rocking element on the opposite side thereof) is a compensating connection. In Figs. 1, 2, 6 and 7 of the drawings, these compensating connections are shown as double cranks 19 and 21. The end portions or crank pins of these cranks are connected to the inner ends of the diagonally opposite front and rear rocking members which are provided with slotted ends as at 22 for this purpose. The intermediate portions or crank shafts of the cranks 19 and 21 are mounted in suitable bearings 24 carried by the chassis so that pivotal movement of any one of the rocking elements which may be caused by the rising or falling of the adjacent road wheel will be transmitted through the respective compensating crank to the diagonally opposite rocking element to which it is connected.

In the modification shown in Figs. 3, 4 and 5, the cranks are dispensed with and the compensating connections take the form of upper cables or lines 26 of steel wire or other suitable material and lower cables or lines 27 which extend directly beneath the corresponding upper cables and are therefore not visible in Fig. 4. One end of each of the upper cables 26 is connected to the inner end of one of the front rocking elements and passes over upper guide rollers 28, its other end being connected to the inner end of the rear rocking element on the opposite side of the vehicle. The lower cables 27 are similarly connected to the inner ends of the respective front and rear rocking frames and pass over lower guide rollers indicated at 29. These guide rollers are mounted on the chassis or suitable extensions therefrom, and may be adjustable to tighten or slacken the cables as required. Or turn-buckles or other means may be provided to adjust the length or tension of the cables.

It will thus be seen that any upward movement of the inner end of a rocking frame about its longitudinal pivots 14 will cause the inner end of the rocking frame to which it is connected to be depressed by the action of the lower cables 28. Likewise, any downward movement of the inner end of the rocking frame on its pivots will cause the inner end of the diagonally opposite rocking frame to be elevated through the medium of the upper cables 26.

Figure 6:
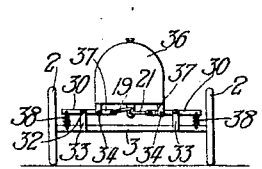
Fig. 6 is a front view of a further modification.
Figure 7:
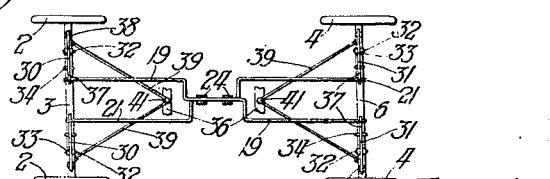
Fig. 7 is a diagrammatic plan of Fig. 6.

In the modification seen in Figs. 6 and 7, front rocking arms 30 and rear rocking arms 31 are employed in lieu of the rocking frames above described. These rocking arms are pivoted by outer pivot pins 32 to standards or uprights 33 which form a rigid connection with the axles. The inner ends of the rocking arms are pivoted by inner pivot pins 34 to the vehicle body or chassis indicated at 36. Beyond these latter pivots the arms are provided with inward extensions 37 which may be connected to the compensating cranks or cables already described. Between the outer ends of the rocking arms 30 and 31 are springs 38, the upper ends of which are suitably connected to the rocking arms and the lower ends to the respective axle.

In this latter embodiment of the invention, the axles are provided with diagonal thrust rods 39, the inner ends of which are connected by ball and socket joints 41 to the chassis or body of the vehicle. These thrust rods serve to take up the diagonal thrust on the axles which thrust will in the case of the rocking frames before described be substantially nullified owing to the greater distance between the two pivotal points 14, of the rocking frames than of the arms 30 and 31.

From the foregoing description, it will be seen that should for instance any one of the vehicle wheels strike an obstruction it will cause the outer end of the adjacent rocking element to rise and the inner end of said element to be depressed. This, through the medium of the compensating cranks or cables will cause the inner end of the rear rocking element on the other side of the vehicle to be elevated and its outer end depressed, thereby tending to force the adjacent rear wheel downwardly against the roadway. This will cause the chassis or body on this side of the vehicle to rise in accordance with the raising of the opposite side due to the impact with the obstruction.

By this means, the body of the vehicle will always be maintained upon a level or horizontal plane laterally. The springs furthermore serve to absorb bumps and jars, and to provide an extremely resilient and efficient suspension for the vehicle.

It will be obvious that the constructional features of the invention may be subject to considerable modification and alteration without departing from its nature, spirit and scope, and it is therefore intended and desired that the appended claims be interpreted as including such modifications or departures as legitimately fall within the scope of the invention.

Having now described my invention what I claim as new and desire to secure by Letters Patent is:—

1. Vehicle suspension means, comprising an intermediately pivoted laterally rocking element associated with each of the wheels of and arranged at substantially a right angle to the vehicle, means for connecting one end of each of said rocking elements with the adjacent axle, and compensating connections between the other ends of the respective diagonally rocking elements.

2. Vehicle suspension means, comprising an intermediately pivoted laterally rocking element associated with each of the wheels of the vehicle, springs between one end of each of said rocking elements and the adjacent axle, and compensating connections between the other ends of the respective diagonally opposite rocking elements.

3. Vehicle suspension means, comprising an intermediately pivoted laterally rocking element associated with each of the wheels of the vehicle, springs between the outer ends of each of the said rocking elements and the adjacent axle, springs between the inner ends of said rocking elements and the chassis or body of the vehicle, and compensating connections between the inner ends of the respective diagonally opposite rocking elements.

4. Vehicle suspension means, comprising an intermediately pivoted laterally rocking element associated with each of the wheels of the vehicle, spring means for connecting one end of each of said rocking elements with the adjacent axle, and a compensating crank member between the other ends of the pair of diagonally opposite rocking elements, said compensating cranks being supported in bearings carried by the chassis of the vehicle.

5. Vehicle suspension means, comprising an intermediately pivoted laterally rocking element associated with each of the wheels of the vehicle, yielding means for connecting the outer end of each of said rocking elements with the adjacent axle, and compensating members directly connecting the inner ends of the respective diagonally opposite rocking elements.

6. Vehicle suspension means, comprising front and rear rocking frames intermediately pivoted on longitudinal axles to the chassis or body of the vehicle, lower springs between the outer ends of said rocking frames and the adjacent axes and a compensating connection between the inner end of each front rocking frame on one side of the vehicle and the rear rocking frame on the opposite side of the vehicle.

7. Vehicle suspension means, comprising front and rear rocking frames pivoted on longitudinal axes near each corner of the chassis, lower springs between the outer ends of said rocking frames and the adjacent axles, slotted inner ends to said frames and double compensating cranks intermediately supported in bearings on the chassis, and having their forward and rear ends connected to the slotted ends of the respective diagonally opposite rocking frames.

8. Vehicle suspension means, comprising front and rear rocking frames intermediately pivoted on longitudinal axes near each corner of the chassis, lower springs between the outer ends of the rocking frames and the adjacent axles, bearing means carried by the chassis, and upper and lower compensating means coöperating with said bearing means, and interconnecting the respective diagonally opposite front and rear rocking frames.

In testimony whereof I affix my signature.

P. D. COSGROVE.

Witness:
 CECIL W. LE CLASTNER.